(12) United States Patent
Wakasugi et al.

(10) Patent No.: US 11,380,887 B2
(45) Date of Patent: Jul. 5, 2022

(54) ANODE ACTIVE MATERIAL (71) Applicant: TOYOTA JIDOSHA KABUSHIKI KAISHA, Toyota (JP)

(72) Inventors: Satoshi Wakasugi, Susono (JP); Jun Yoshida, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/658,248

(22) Filed: Oct. 21, 2019

(65) Prior Publication Data

US 2020/0136131 A1 Apr. 30, 2020

(30) Foreign Application Priority Data

Oct. 24, 2018 (JP) .............................. JP2018-199839

(51) Int. Cl.
*H01M 4/36* (2006.01)
*H01M 4/38* (2006.01)
*H01M 4/40* (2006.01)
*H01M 4/02* (2006.01)

(52) U.S. Cl.
CPC ........... *H01M 4/364* (2013.01); *H01M 4/386* (2013.01); *H01M 4/405* (2013.01); *H01M 2004/027* (2013.01)

(58) Field of Classification Search
CPC ...... H01M 4/364; H01M 4/386; H01M 4/405; H01M 2004/027; H01M 10/0562
See application file for complete search history.

(56) References Cited

U.S. PATENT DOCUMENTS

| | | | |
|---|---|---|---|
| 5,556,721 A | 9/1996 | Sasaki et al. | |
| 2017/0352881 A1 | 12/2017 | Minami et al. | |
| 2019/0051928 A1* | 2/2019 | Kawasaki | H01M 4/133 |
| 2019/0296336 A1* | 9/2019 | Cho | H01M 10/0525 |

FOREIGN PATENT DOCUMENTS

| | | |
|---|---|---|
| JP | 07-029602 A | 1/1995 |
| JP | 4911835 B2 | 4/2012 |
| JP | 2012-243408 A | 12/2012 |
| JP | 2016-225187 A | 12/2016 |
| WO | 2016/121323 A1 | 8/2016 |

* cited by examiner

*Primary Examiner* — Andrew J. Oyer (74) *Attorney, Agent, or Firm* — Sughrue Mion, PLLC (57) ABSTRACT

Provided is an anode active material configured to achieve both an increase in the coulombic efficiency during initial charge and discharge of an all-solid-state battery, and suppression of an increase in the resistance of the all-solid-state battery. The anode active material may be an anode active material, wherein the anode active material is an anode active material for use in all-solid-state batteries; wherein the anode active material comprises a lithium-silicon alloy and elemental silicon; and wherein the anode active material has peaks at positions of $2\theta=20.2°\pm0.5°$, $23.3°\pm0.5°$, $40.5°\pm0.5°$, and $46.0°\pm0.5°$ in a XRD spectrum obtained by XRD measurement using CuKα radiation.

14 Claims, 3 Drawing Sheets

ANODE ACTIVE MATERIAL

TECHNICAL FIELD

The disclosure relates to an anode active material for all-solid-state batteries.

BACKGROUND

An active material (an alloy-based active material) containing a metal that can be alloyed with Li, such as Si, has large theoretical capacity per volume, compared to a carbon-based anode active material. Accordingly, an all-solid-state battery in which such an alloy-based active material is used in the anode, has been proposed.

An all-solid-state secondary battery is disclosed in Patent Literature 1, in which both a carbon-based anode active material and a Si-based anode active material are used in the anode active material layer. Patent Literature 1 describes that a decrease in discharge capacity is suppressed when the all-solid-state secondary battery is charged at high rate.

Patent Literature 1: Japanese Patent Application Laid-Open No. 2016-225187

However, it is difficult for the all-solid-state battery using the Si-based anode active material to suppress an increase in the resistance of the battery, with increasing the coulombic efficiency during initial charge and discharge of the battery.

SUMMARY

The disclosed embodiments were achieved in light of the above circumstances of the Si-based anode active material. An object of the disclosed embodiments is to provide an anode active material configured to achieve both an increase in the coulombic efficiency during initial charge and discharge of an all-solid-state battery, and suppression of an increase in the resistance of the all-solid-state battery.

In a first embodiment, there is provided an anode active material, wherein the anode active material is an anode active material for use in all-solid-state batteries; wherein the anode active material comprises a lithium-silicon alloy and elemental silicon; and wherein the anode active material has peaks at positions of $2\theta=20.2°\pm0.5°$, $23.3°\pm0.5°$, $40.5°\pm0.5°$, and $46.0°\pm0.5°$ in a XRD spectrum obtained by XRD measurement using CuKα radiation.

The element ratio of the lithium based on the silicon in the anode active material, may be from 0.20 to 4.0.

The lithium-silicon alloy and the elemental silicon may be particulate.

The elemental silicon may be crystalline.

The anode active material may further have peaks at positions of $2\theta=28.5°\pm0.5°$, $47.0°\pm0.5°$, and $56.0°\pm0.5°$ in the XRD spectrum.

By using the anode active material of the disclosed embodiments in an all-solid-state battery, both an increase in the coulombic efficiency during initial charge and discharge of the all-solid-state battery, and suppression of an increase in the resistance of the all-solid-state battery, can be achieved.

BRIEF DESCRIPTION OF THE DRAWINGS

In the accompanying drawings.

DETAILED DESCRIPTION

The anode active material of the disclosed embodiments is an anode active material, wherein the anode active material is an anode active material for use in all-solid-state batteries; wherein the anode active material comprises a lithium-silicon alloy and elemental silicon; and wherein the anode active material has peaks at positions of $2\theta=20.2°\pm0.5°$, $23.3°\pm0.5°$, $40.5°\pm0.5°$, and $46.0°\pm0.5°$ in a XRD spectrum obtained by XRD measurement using CuKα radiation.

It was discovered that when Si crystal is used as the anode active material of an all-solid-state battery, irreversible capacity occurs during initial discharge of the all-solid-state battery. It is thought that this is derived from the properties of the Si crystal having a diamond-type crystal structure, and part of Li that is alloyed with Si during charge, is turned into Li that is not ionized during discharge and makes no contribution to discharge reaction. Hereinafter, such Li may be referred to as "irreversible Li".

When only Si is used as the anode active material, irreversible Li is produced during initial charge and discharge and irreversible capacity occurs. As a result, the coulombic efficiency of the all-solid-state battery is decreased during initial charge and discharge. In this case, during charge and discharge, an amorphous LiSi alloy and the Si are mixed in each particle of the anode active material.

Meanwhile, there is an increase in battery resistance when only a crystalline LiSi alloy that is less prone to irreversible Li, is used as the anode active material for the purpose of increasing the coulombic efficiency during initial charge and discharge. It is thought that this is because Li has difficulty transferring in the crystalline LiSi alloy, compared to Si.

As a result of research, it was discovered that by using both a lithium-silicon alloy (a LiSi alloy) and elemental silicon as the anode active material of an all-solid-state battery, irreversible Li can be reduced, and both an increase in the coulombic efficiency during initial charge and discharge and suppression of an increase in the resistance can be achieved.

The anode active material of the disclosed embodiments has peaks at positions of $2\theta=20.2°$, $23.3°$, $40.5°$, and $46.0°$ in the XRD spectrum obtained by XRD measurement using CuKα radiation. All of the four peaks may be assigned to the lithium-silicon alloy. That is, the lithium-silicon alloy may be crystalline; the lithium-silicon alloy may be mainly composed of crystal; or the lithium-silicon alloy may be crystal.

As the LiSi alloy crystal, for example, $Li_{12}Si_7$ crystal, $Li_{13}Si_4$ crystal, $Li_{15}Si_4$ crystal and $Li_{22}Si_5$ crystal are known. The peaks (2θ) in the XRD spectra of the alloy crystals are as follows. The XRD spectra are those measured by using CuKα as the X-ray source.

$Li_{12}Si_7$: 2θ=23.1°, 23.4°, 40.0°, 42.0°, 42.8°, 45.7°, 46.4°, 50.9°, 64.5°

$Li_{13}Si_4$: 2θ=20.4°, 22.0°, 22.7°, 23.4°, 40.4°, 40.7°, 41.9°, 42.8°, 45.1°, 48.1°, 62.6°

$Li_{15}Si_4$: 2θ=20.1°, 23.3°, 26.1°, 31.0°, 36.2°, 39.1°, 40.9°, 42.8°, 46.2°, 55.1°, 61.0°, 68.7°

$Li_{22}Si_5$: 2θ=15.4°, 20.4°, 23.0°, 24.4°, 39.0°, 40.5°, 58.8°

In the disclosed embodiments, all or part of the 2θ values (2θ=20.2°, 23.3°, 40.5°, and 46.0°) are values that are equal to or close to the above-mentioned 2θ values of the known LiSi alloy crystals. The lithium-silicon alloy in the anode active material of the disclosed embodiments may be an alloy retaining the crystal structure of a conventional lithium-silicon alloy.

The position of each peak may have a minor deviation. The deviation is allowable as long as it is in a range of the 2θ value ±0.5°. In the disclosed embodiments, "±0.5°" following the 2θ value means the allowable deviation range of the 2θ value.

The conditions of the XRD measurement of the anode active material are as follows.

X-ray diffraction measurement device: RINT-2500 (manufactured by Rigaku Corporation)
X-ray source: CuKα
Measurement range: 2θ=20° to 70°
Measurement interval: 0.02°
Scan rate: 10°/min
Measurement voltage: 50 kV
Measurement current: 300 mA The advantage of the fact that the anode active material of the disclosed embodiments is an anode active material for all-solid-state batteries, relates to the use of the lithium-silicon alloy. When the lithium-silicon alloy is used in a battery containing a liquid electrolyte, the lithium-silicon alloy reacts with the liquid electrolyte. As a result, a coating film is formed on the surface of the alloy and may lead to an increase in the resistance of the battery. Meanwhile, an all-solid-state battery does not contain a liquid electrolyte, or it contains a relatively small amount of liquid electrolyte. Accordingly, the lithium-silicon alloy has few opportunities for contact with the liquid electrolyte, and the coating film is less likely to be formed thereon.

The advantage of the crystalline lithium-silicon alloy relates to the fact that the anode active material of the disclosed embodiments is an anode active material for all-solid-state batteries.

In the amorphous lithium-silicon alloy, Li and Si are randomly arranged. In such an amorphous state, a part where Li can easily transfer and a part where Li cannot easily transfer, are mixed. An all-solid-state battery generally include a solid electrolyte layer. However, at the interface between the anode and the solid electrolyte layer, variation in Li transfer occurs between the solid electrolyte and the amorphous lithium-silicon alloy. Such a mechanism can be also inferred from, for example, the below-described result of Comparative Example 1, that is, the following result: during initial charge and discharge, the anode active material in which the elemental silicon and the amorphous lithium-silicon alloy are mixed, shows low coulombic efficiency during initial charge and discharge.

Meanwhile, in the crystalline lithium-silicon alloy, Li and Si are regularly arranged. In such crystal, variation in the easiness of Li transfer is small. Accordingly, Li transfer is easy at the interface between the anode and solid electrolyte layer of the all-solid-state battery, resulting in an increase in the coulombic efficiency during initial charge and discharge.

The crystalline lithium-silicon alloy is less likely to be amorphized even after charge and discharge. This is because, even after Li is desorbed after discharge, the bonding relationship of the Si elements is retained, and the crystal structure is less likely to change. The crystal structures of the four lithium-silicon alloys are as follows. These crystal structures are retained even after Li desorption.

$Li_{12}Si_7$: Orthorhombic Pnma
$Li_{13}Si_4$: Orthorhombic Pbam
$Li_{15}Si_4$: Cubic I-43d
$Li_{22}Si_5$: Cubic F-43m The crystallinity of the crystalline lithium-silicon alloy is not particularly limited, as long as the peaks of the above-described 2θ values (2θ=20.2°, 23.3°, 40.5° and 46.0°) are present in the XRD spectrum.

The crystallinity of the crystalline lithium-silicon alloy may be 80% or more, may be 90% or more, or may be 100%. The lithium-silicon alloy having a crystallinity of 100% means lithium-silicon alloy crystal (LiSi alloy crystal). The crystallinity of the lithium-silicon alloy is defined by "(2) Absolute method" described in "13. Crystallinity" by JIS K 0131.

The crystalline lithium-silicon alloy may be a commercially-available product, or it may be synthesized in advance.

The crystalline lithium-silicon alloy may be synthesized by the following method, for example: a Li metal and Si are put in a crucible, and the crucible is heated under an inert atmosphere. The method for synthesizing the crystalline lithium-silicon alloy, is not limited to this method.

In addition to the lithium-silicon alloy, the anode active material of the disclosed embodiments contains the elemental silicon. In a conventional anode active material containing Si, part of Li that is allowed with Si by initial charge, is turned into irreversible Li that makes no contribution to subsequent discharge reaction. It is thought that this is because the irreversible Li is Li that is more energetically stable than other free Li. More specifically, the irreversible Li means Li that is more strongly bound to Si than Li that transfers inside the battery during charge and discharge. Depending on charge and discharge reactions, the irreversible Li is less likely to desorb from Si. Accordingly, it is a factor in disrupting an increase in the coulombic efficiency during initial charge and discharge.

In the anode active material of the disclosed embodiments, both the elemental silicon and the lithium-silicon alloy are used. In this case, during initial charge, Li reacts with both the elemental silicon and the lithium-silicon alloy. That is, both of them form a bond with Li. Accordingly, the proportion of Li bound to the elemental silicon is relatively decreased by the proportion of Li bound to the lithium-silicon alloy. Almost all of the Li bound to the lithium-silicon alloy contributes to discharge reaction. Accordingly, the proportion of the irreversible Li bound to the elemental silicon is decreased than ever before. As a result, the coulombic efficiency during initial charge and discharge can be increased.

The elemental silicon contained in the anode active material of the disclosed embodiments, may be crystalline or amorphous. The elemental silicon may be crystalline; the elemental silicon may be mainly composed of crystal; or the elemental silicon may be crystal. For the all-solid-state battery in which the crystalline elemental silicon is used, the coulombic efficiency during initial charge and discharge is higher than the all-solid-state battery in which the amorphous elemental silicon is used.

The crystallinity of the elemental silicon may be 80% or more, may be 90% or more, or may be 100%. The elemental silicon having a crystallinity of 100% means elemental silicon crystal. The crystallinity of the elemental silicon is defined by "(2) Absolute method" descried in "13. Crystallinity" by JIS K 0131.

The presence of the LiSi alloy crystal can be confirmed by appearance of the peaks of the LiSi alloy crystal by XRD measurement.

The presence of the amorphous elemental silicon can be confirmed by appearance of a broad peak by Raman spectroscopy measurement, which has a peak top at 480 $cm^{-1}$.

Accordingly, by carrying out the above measurements on the anode active material, it can be determined whether the anode active material contains the LiSi alloy crystal or not, and whether the anode active material contains the amorphous elemental silicon or not.

The anode active material of the disclosed embodiments may further have peaks at positions of $2\theta=28.5°$, $47.0°$, and $56.0°$ in the XRD spectrum obtained by XRD measurement using CuKα radiation. These 2θ values ($2\theta=28.5°$, $47.0°$ and $56.0°$) are those of the Si crystal having the diamond-type crystal structure. The position of each peak may have a minor deviation. The deviation is allowable as long as it is in a range of the 2θ value±0.5°.

The element ratio of the lithium (Li) based on the silicon (Si) in the anode active material, may be from 0.20 to 4.0, may be from 0.30 to 3.9, or may be from 0.40 to 3.8. As used herein, "based on the silicon (Si)" means "when the element ratio of the silicon (Si) in the anode active material, is determined as 1.0".

When the element ratio of the Li is less than 0.20, the Li element in the anode active material is too small. Accordingly, the coulombic efficiency during initial charge and discharge of the all-solid-state battery containing the anode active material, may decrease. On the other hand, when the element ratio of the Li is more than 4.0, the Si element in the anode active material is relatively too small. Accordingly, the internal resistance of the all-solid-state battery containing the anode active material may be high.

When the total of the molar amount of the lithium-silicon alloy and that of the elemental silicon is determined as 100 mol %, the molar ratio of the lithium-silicon alloy to the elemental silicon may be in a range of from 0.5:99.5 to 80:20, may be in a range of from 0.7:99.3 to 75:25, or may be in a range of from 1.0:99 to 70:30, all in terms of mol %. Since the molar ratio of the lithium-silicon alloy to the elemental silicon in the anode active material is in the above ranges, both a further increase in the coulombic efficiency during initial charge and discharge of the all-solid-state battery containing the anode active material, and further suppression of an increase in the resistance of the all-solid-state battery, can be achieved.

The anode active material of the disclosed embodiments may contain lithium-silicon alloy particles and elemental silicon particles. That is, in the anode active material, both the above-described lithium-silicon alloy and elemental silicon may be present in a particulate form. In this case, it is highly probable that in the anode active material, the lithium-silicon alloy and the elemental silicon are present as different kinds of particles, and the lithium-silicon alloy particles are in physical contact with the elemental silicon particles. Accordingly, lithium ion transfer between the two kinds of particles is allowed and makes it possible to compensate for their disadvantages. As a result, the all-solid-state battery containing the anode active material can achieve both an increase in the coulombic efficiency during initial charge and discharge and suppression of an increase in the resistance, with balance.

The all-solid-state battery can be produced by use of the anode active material. As the structure of the all-solid-state battery, examples include, but are not limited to, a structure including the cathode, the anode containing the anode active material, and the solid electrolyte layer disposed between the cathode and the anode.

The cathode contains at least a cathode active material. As needed, it may further contain a solid electrolyte, an electroconductive material, a binder, etc.

The cathode active material used in the cathode is not particularly limited. As the cathode active material, examples include, but are not limited to, $LiNi_{1/3}Co_{1/3}Mn_{1/3}O_2$. The cathode active material may be coated with $LiNbO_3$ in advance.

The solid electrolyte used in the cathode is not particularly limited. As the solid electrolyte, examples include, but are not limited to, sulfide-based solid electrolytes such as $Li_2S$—$LiBr$—$LiI$—$P_2S_5$.

The electroconductive material used in the cathode is not particularly limited. As the electroconductive material, examples include, but are not limited to, a carbonaceous material and metal particles. As the carbonaceous material, examples include, but are not limited to, particulate carbonaceous materials such as Acetylene Black (AB) and Ketjen Black (KB), carbon fiber such as VGCF, and fibrous carbon materials such as carbon nanotube (CNT) and carbon nanofiber (CNF). As the metal particles, examples include, but are not limited to, Ni, Cu, Fe and SUS.

The binder used in the cathode is not particularly limited. As the binder, examples include, but are not limited to, rubber-based binders such as butadiene rubber, hydrogenated butadiene rubber, styrene-butadiene rubber (SBR), hydrogenated styrene-butadiene rubber, nitrile-butadiene rubber, hydrogenated nitrile-butadiene rubber and ethylene-propylene rubber; fluoride-based binders such as polyvinylidene fluoride (PVDF), polyvinylidene fluoride-polyhexafluoropropylene copolymer (PVDF-HFP), polytetrafluoroethylene and fluorine rubber; polyolefin-based thermoplastic resins such as polyethylene, polypropylene and polystyrene; imide-based resins such as polyimide and polyamideimide; amide-based resins such as polyamide; acrylic resins such as polymethyl acrylate and polyethyl acrylate; and methacrylic resins such as polymethyl methacrylate and polyethyl methacrylate.

The anode contains at least the above-described anode active material. As needed, it may contain a solid electrolyte, a binder, etc. The solid electrolyte and binder used in the anode are the same as those used in the cathode.

The solid electrolyte layer is disposed between the cathode and the anode. Ion conduction occurs between the cathode and anode active materials, through the solid electrolyte layer.

As the solid electrolyte layer, examples include, but are not limited to, a layer containing a sulfide-based solid electrolyte such as $Li_2S$—$LiBr$—$LiI$—$P_2S_5$.

The all-solid-state battery can be produced by forming the cathode on one surface of the solid electrolyte layer and forming the anode on the other surface of the solid electrolyte layer.

The coulombic efficiency during initial charge and discharge of the all-solid-state battery containing the anode active material of the disclosed embodiments, is measured by the following method.

First, the all-solid-state battery containing the anode active material of the disclosed embodiments, which is not subjected to initial charge and discharge, is charged with constant current and constant voltage (CC/CV charge) at 0.245 mA to 4.35 V (initial charge). Next, the all-solid-state battery is discharged with constant current and constant voltage (CC/CV discharge) at 0.245 mA to 3.0 V (initial discharge).

The coulombic efficiency A during initial charge and discharge is obtained by the following formula (I):

$$A = (C_1/C_2) \times 100 \quad \text{Formula (I)}$$

where A is coulombic efficiency (%) during initial charge and discharge; $C_1$ is initial discharge capacity (mAh); and $C_2$ is initial charge capacity (mAh).

EXAMPLES

1. Production of Anode Active Material

Example 1

(1) Preparation of LiSi Alloy

First, 0.44 g of a Li metal (manufactured by Honjo Metal Co., Ltd.) and 1.04 g of Si (manufactured by Kojundo Chemical Laboratory Co., Ltd., crystallinity 100%) were put in a crucible and sintered at 800° C. under an Ar atmosphere, thereby preparing $Li_{12}Si_7$.

(2) Production of Anode Active Material

First, 0.67 g of $Li_{12}Si_7$ and 0.33 g of Si (manufactured by Kojundo Chemical Laboratory Co., Ltd., crystallinity 100%) were mixed in an agate mortar, thereby producing the anode active material of Example 1.

Examples 2 to 7

The anode active materials of Examples 2 to 7 were produced in the same manner as Example 1, except that the amounts of the mixed raw materials were changed as shown in the following Table 1.

Comparative Example 1

As the anode active material of Comparative Example 1, 1.0 g of Si (manufactured by Kojundo Chemical Laboratory Co., Ltd., crystallinity 100%) was used.

Comparative Examples 2 to 5

A LiSi alloy was prepared in the same manner as Example 1, except that in "(1) Preparation of LiSi alloy", the amounts of the mixed raw materials were changed as shown in the following Table 1. Then, 1.0 g of the thus-obtained LiSi alloy was used as the anode active material of Comparative Example 2. The anode active materials of Comparative Examples 3 to 5 were obtained in the same manner as Comparative Example 2.

2. XRD Measurement

X-ray diffraction (XRD) measurement was carried out on the anode active materials of Examples 1 to 7 and Comparative Examples 1 to 5, in the following conditions.

Figure 1:
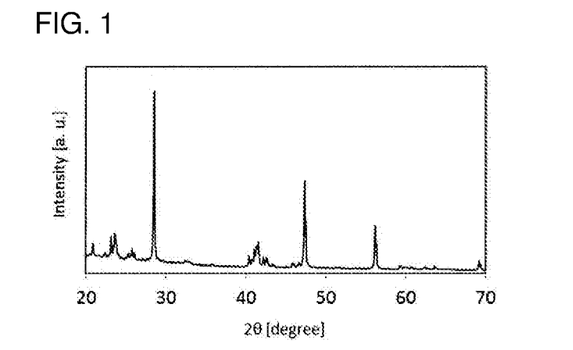
FIG. 1 is a XRD spectrum of the anode active material of Example 1.
Figure 2:
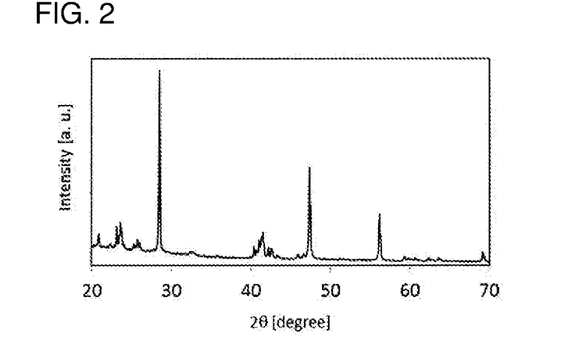
FIG. 2 is a XRD spectrum of the anode active material of Example 2.
Figure 3:
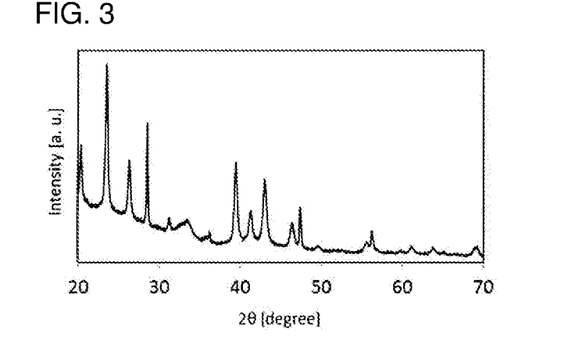
FIG. 3 is a XRD spectrum of the anode active material of Example 3.
Figure 4:
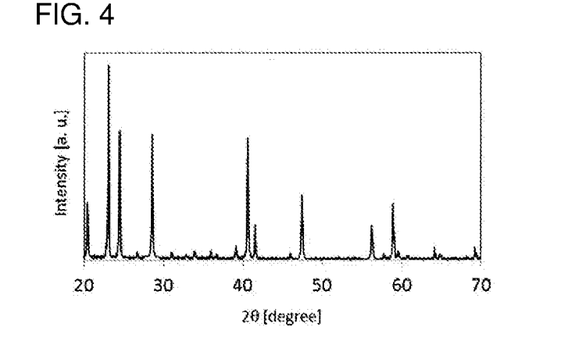
FIG. 4 is a XRD spectrum of the anode active material of Example 4.
Figure 5:
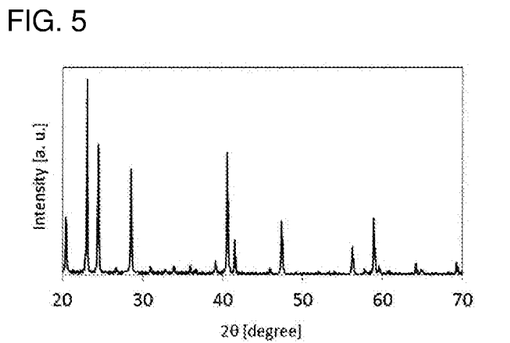
FIG. 5 is a XRD spectrum of the anode active material of Example 5.
Figure 6:
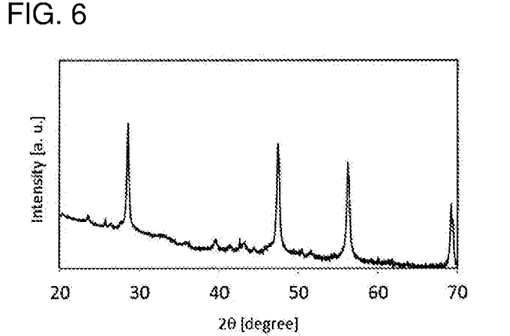
FIG. 6 is a XRD spectrum of the anode active material of Example 6.
Figure 7:
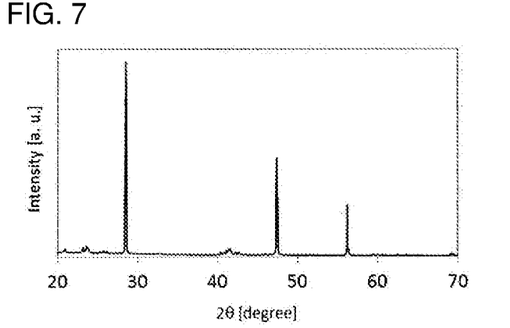
FIG. 7 is a XRD spectrum of the anode active material of Example 7.
Figure 8:
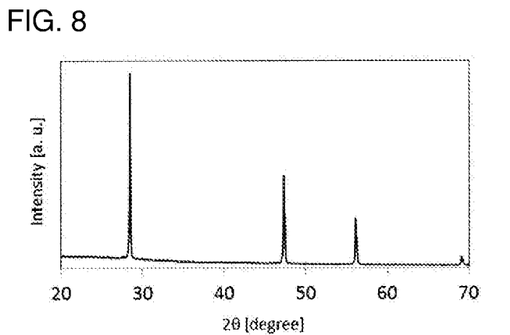
FIG. 8 is a XRD spectrum of the anode active material of Comparative Example 1.
Figure 9:
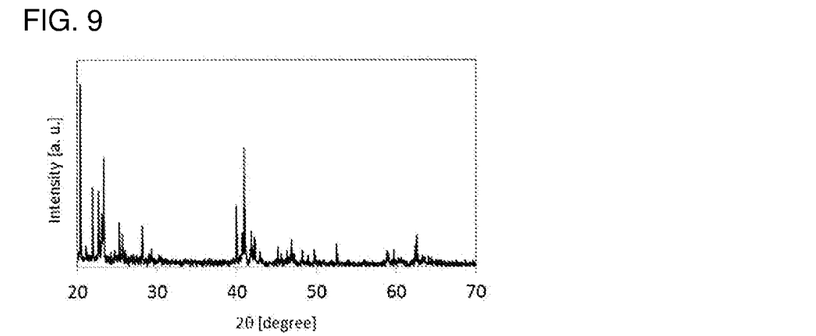
FIG. 9 is a XRD spectrum of the anode active material of Comparative Example 2.
Figure 10:
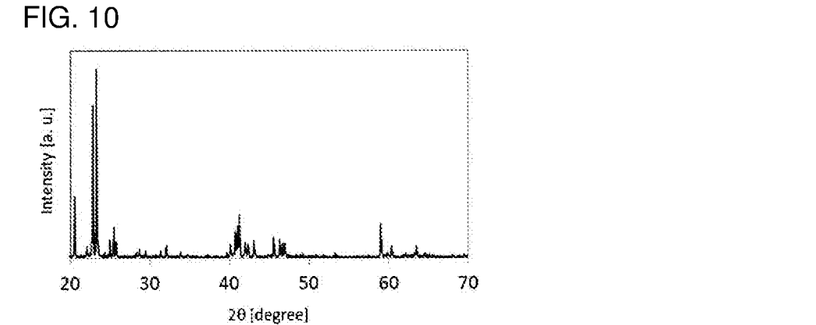
FIG. 10 is a XRD spectrum of the anode active material of Comparative Example 3.
Figure 11:
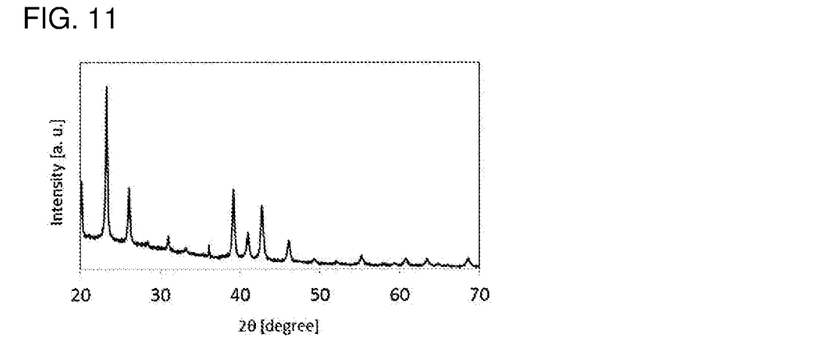
FIG. 11 is a XRD spectrum of the anode active material of Comparative Example 4.
Figure 12:
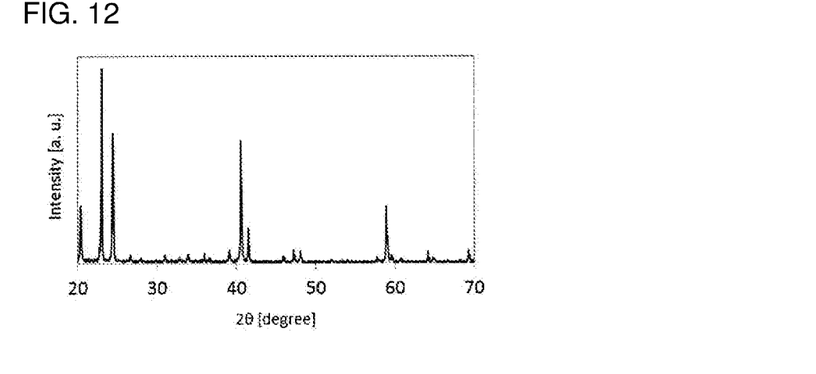
FIG. 12 is a XRD spectrum of the anode active material of Comparative Example 5.

X-ray diffraction measurement device: RINT-2500 (manufactured by Rigaku Corporation)
X-ray source: CuKα
Measurement range: 2θ=20° to 70°
Measurement interval: 0.02°
Scan rate: 10°/min
Measurement voltage: 50 kV
Measurement current: 300 mA FIGS. 1 to 12 are XRD spectra of the anode active materials of Examples 1 to 7 and Comparative Examples 1 to 5.

The following Table 1 shows the amounts of the mixed raw materials of Examples 1 to 7 and Comparative Examples 1 to 5. In Table 1, "LiSi alloy: Si (in terms of mol %)" indicates the molar ratio of the raw materials in each experimental result, based on the following molecular weights.

$Li_{12}Si_7$: 279.89 (g/mol)
$Li_{13}Si_4$: 202.58 (g/mol)
$Li_{15}Si_4$: 216.46 (g/mol)
$Li_{22}Si_5$: 293.13 (g/mol)
Si: 28.1 (g/mol)

In the following Table 2, the 2θ values of the anode active materials of Examples 1 to 7 and Comparative Examples 1 to 5 are listed.

TABLE 1

| | (1) Preparation of LiSi alloy | | (2) Production of anode active material | | |
|---|---|---|---|---|---|
| | Li (g) | Si (g) | LiSi alloy (g) | Si (g) | LiSi alloy:Si (in terms of mol %) |
| Example 1 | 0.44 | 1.04 | 0.67 | 0.33 | 17:83 |
| Example 2 | 0.60 | 0.75 | 0.67 | 0.33 | 22:78 |
| Example 3 | 0.60 | 0.65 | 0.93 | 0.07 | 63:37 |
| Example 4 | 0.60 | 0.55 | 0.92 | 0.08 | 52:48 |
| Example 5 | 0.60 | 0.55 | 0.95 | 0.05 | 65:35 |
| Example 6 | 0.60 | 0.65 | 0.19 | 0.81 | 3:97 |
| Example 7 | 0.60 | 0.65 | 0.10 | 0.90 | 1:99 |
| Comparative Example 1 | — | — | 0 | 1.0 | 0:100 |
| Comparative Example 2 | 0.44 | 1.04 | 1.0 | 0 | 100:0 |
| Comparative Example 3 | 0.60 | 0.75 | 1.0 | 0 | 100:0 |
| Comparative Example 4 | 0.60 | 0.65 | 1.0 | 0 | 100:0 |
| Comparative Example 5 | 0.60 | 0.55 | 1.0 | 0 | 100:0 |

TABLE 2

| | 2θ (°) |
|---|---|
| Example 1 | 20.5, 23.3, 28.0, 40.2, 41.0, 46.2, 47.5, 56.5, 69.0 |
| Example 2 | 20.6, 23.0, 28.2, 40.5, 41.0, 46.2, 47.4, 56.4, 69.0 |
| Example 3 | 20.2, 22.8, 27.2, 28.5, 33.0, 39.7, 40.5, 42.0, 46.0, 47.5, 56.5, 69.0 |
| Example 4 | 20.1, 23.0, 24.0, 28.5, 39.5, 40.2, 41.0, 46.0, 47.5, 56.5, 59.5 |
| Example 5 | 20.1, 23.0, 24.0, 28.5, 39.5, 40.2, 41.0, 46.0, 47.5, 56.5, 59.5 |
| Example 6 | 20.1, 23.0, 24.0, 28.7, 39.7, 41.0, 42.5, 46.5, 47.5, 56.5, 69.5 |
| Example 7 | 20.7, 23.8, 24.5, 28.7, 40.1, 43.0, 46.2, 47.5, 56.3, 68.0 |
| Comparative Example 1 | 28.5, 47.5, 56.0, 69.0 |

TABLE 2-continued

| | 2θ (°) |
|---|---|
| Comparative Example 2 | 20.2, 22.1, 22.7, 23.3, 25.0, 29.1, 40.0, 40.5, 41.0, 46.2, 63.2 |
| Comparative Example 3 | 20.3, 22.8, 23.0, 25.2, 41.0, 46.1, 59.0 |
| Comparative Example 4 | 20.0, 22.9, 26.8, 31.0, 39.8, 40.5, 42.5, 46.2, 69.0 |
| Comparative Example 5 | 20.2, 23.0, 24.8, 39.5, 40.5, 41.5, 46.5, 59.8 |

3. Production of All-solid-state Battery
(1) Synthesis of Solid Electrolyte

The following materials were mixed in an agate mortar for 5 minutes.

$Li_2S$ (manufactured by Furuuchi Chemical Corporation): 0.550 g $P_2S_5$ (manufactured by Aldrich): 0.887 g LiI (manufactured by Nippoh Chemicals Co., Ltd.): 0.285 g LiBr (manufactured by Kojundo Chemical Laboratory Co., Ltd.): 0.277 g A mixture thus obtained was further mixed with 4 g of n-heptane (dehydrated grade, manufactured by Kanto Chemical Co., Inc.) The mixture was subjected to mechanical milling for 40 hours by use of a planetary ball mill, thereby synthesizing a solid electrolyte ($Li_2S$—LiBr—LiI—$P_2S_5$).

(2) Preparation of Anode Mixture

The following materials for an anode mixture were mixed by an ultrasonic homogenizer ("UH-50" manufactured by SMT) to obtain a mixture. The mixture was used as an anode mixture.

The $Li_{12}Si_7$ synthesized in Example 1: 0.67 g

Si (manufactured by Kojundo Chemical Laboratory Co., Ltd.): 0.33 g

Electroconductive material (VGCF manufactured by Showa Denko K. K.): 0.04 g

The above-synthesized solid electrolyte ($Li_2S$—LiBr—LiI—$P_2S_5$): 0.776 g

Solvent (n-heptane, manufactured by Kanto Chemical Co., Inc., dehydrated grade): 1.7 g (3) Preparation of Cathode Mixture The following materials for a cathode mixture were mixed by the ultrasonic homogenizer ("UH-50" manufactured by SMT) to obtain a mixture. The mixture was used as a cathode mixture.

Cathode active material: 1.5 g

Electroconductive material (VGCF manufactured by Showa Denko K. K.): 0.023 g

The above-synthesized solid electrolyte ($Li_2S$—LiBr—LiI—$P_2S_5$): 0.239 g

Butyl butyrate (manufactured by Kishida Chemical Co., Ltd.): 0.8 g

As the cathode active material, $LiNi_{1/3}Co_{1/3}Mn_{1/3}O_2$ (manufactured by Nichia Corporation) was used. The cathode active material was surface-treated with $LiNbO_3$ in advance.

(4) Production of All-solid-state Battery

First, 0.065 g of the solid electrolyte ($Li_2S$—LiBr—LiI—$P_2S_5$) was put in a ceramic mold (cross-sectional area: 1 cm²) and pressed at 1 ton/cm², thereby forming a solid electrolyte layer. Next, 0.018 g of the cathode mixture was disposed on one surface of the solid electrolyte layer and pressed at 1 ton/cm², thereby forming a cathode. Then, 0.0054 g of the anode mixture was disposed on the other surface of the solid electrolyte layer and pressed at 4 ton/cm², thereby forming an anode. A cathode current collector (an aluminum foil) was disposed on the cathode side, and an anode current collector (a cupper foil) was disposed on the anode side, thereby producing the all-solid-state battery of Example 1.

The all-solid-state batteries of Examples 2 to 7 were produced as follows.

The all-solid-state batteries of Examples 2 to 7 were produced in the same manner as the all-solid-state battery of Example 1, except for the following points: in "(2) Preparation of anode mixture", instead of the $Li_{12}Si_7$ synthesized in Example 1, the LiSi alloys used in the anode active materials of Examples 2 to 7 were each used, and the amounts of the LiSi alloy and Si used were changed as shown in Table 1 (see "(2) Production of anode active material").

The all-solid-state battery of Comparative Example 1 was produced as follows.

The all-solid-state battery of Comparative Example 1 was produced in the same manner as the all-solid-state battery of Example 1, except that in "(2) Preparation of anode mixture", the $Li_{12}Si_7$ synthesized in Example 1 was not used, and the amount of the Si used was changed from 0.33 g to 1.0 g.

The all-solid-state batteries of Comparative Examples 2 to 5 were produced as follows.

The all-solid-state batteries of Comparative Examples 2 to 5 were produced in the same manner as the all-solid-state battery of Example 1, except that in "(2) Preparation of anode mixture", the $Li_{12}Si_7$ synthesized in Example 1 and the Si were not used, and instead of them, the anode active materials (the LiSi alloys) of Comparative Examples 2 to 5 were each used in an amount of 1.0 g.

4. Evaluation of All-solid-state Batteries

The all-solid-state batteries of Examples 1 to 7 and Comparative Examples 1 to 5 were subjected to the following measurements.

(1) Measurement for Coulombic Efficiency During Initial Charge and Discharge

Each all-solid-state battery was charged with constant current and constant voltage (CC/CV charge) at 0.245 mA to 4.35 V (initial charge). Next, it was discharged with constant current and constant voltage (CC/CV discharge) at 0.245 mA to 3.0 V (initial discharge).

The coulombic efficiency A during initial charge and discharge of the all-solid-state battery was obtained by the following formula (I):

$$A = (C_1/C_2) \times 100 \qquad \text{Formula (I)}$$

where A is coulombic efficiency (%) during initial charge and discharge; $C_1$ is initial discharge capacity (mAh); and $C_2$ is initial charge capacity (mAh).

(2) Measurement for Internal Resistance

Each all-solid-state battery was charged at 0.245 mA to a voltage of 3.7 V. Then, it was discharged for 5 seconds in a high current condition (7.35 mA). From the resulting change in voltage, the internal resistance (Ω) of the all-solid-state battery was measured.

5. Results and Consideration

For the all-solid-state batteries of Examples 1 to 7 and Comparative Examples 1 to 5, the following Table 3 shows the values of the coulombic efficiency during initial charge and discharge and the specific internal resistance, for comparison, along with the information on the composition of the corresponding anode active material. As shown in the following Table 3, the section of "Raw materials" under "Composition" shows the raw materials for the anode active material used for the preparation of the anode mixture, and the section of "Based on Si" shows the compositional formula of the whole anode active material based on the Si. Also in Table 3, the meaning of symbols shown under "Elemental Si" are as follows.

+: Elemental Si was used as a raw material for the anode active material.

−: Elementa Si was not used as a raw material for the anode active material.

In the following Table 3, "Specific internal resistance" is the ratio of the internal resistance of each all-solid-state battery when the internal resistance of the all-solid-state battery of Comparative Example 1 is determined as 1.00.

efficiency during initial charge and discharge of Comparative Example 1. The specific internal resistances of the all-solid-state batteries of Examples 1 to 7 are from 1.01 to 1.11 each. This results indicates that the internal resistances of the all-solid-state batteries of Examples 1 to 7 have an increase rate of 10% or less each, compared to the internal resistance of the all-solid-state battery of Comparative Example 1. It is thought that this is because, since both the elemental Si and the crystalline LiSi alloy was used as the anode active material in Examples 1 to 7, the coulombic efficiency during initial charge and discharge was increased, with suppressing an increase in resistance when the Li transferred inside the anode active material.

TABLE 3

| | Composition | | | Coulombic efficiency (%) during initial charge and discharge | Specific internal resistance |
|---|---|---|---|---|---|
| | Raw materials | Based on Si | Elemental Si | | |
| Example 1 | $Li_{12}Si_7$ + Si | $Li_{1.0}Si$ | + | 87 | 1.11 |
| Example 2 | $Li_{13}Si_4$ + Si | $Li_{1.71}Si$ | + | 93 | 1.05 |
| Example 3 | $Li_{15}Si_4$ + Si | $Li_{3.25}Si$ | + | 94 | 1.02 |
| Example 4 | $Li_{22}Si_5$ + Si | $Li_{3.75}Si$ | + | 94 | 1.03 |
| Example 5 | $Li_{22}Si_5$ + Si | $Li_{4.0}Si$ | + | 93 | 1.08 |
| Example 6 | $Li_{15}Si_4$ + Si | $Li_{0.4}Si$ | + | 92 | 1.04 |
| Example 7 | $Li_{15}Si_4$ + Si | $Li_{0.2}Si$ | + | 78 | 1.01 |
| Comparative Example 1 | Si | Si | + | 76 | 1.00 |
| Comparative Example 2 | $Li_{12}Si_7$ | $Li_{1.71}Si$ | − | 84 | 1.31 |
| Comparative Example 3 | $Li_{13}Si_4$ | $Li_{3.25}Si$ | − | 93 | 1.29 |
| Comparative Example 4 | $Li_{15}Si_4$ | $Li_{3.75}Si$ | − | 94 | 1.24 |
| Comparative Example 5 | $Li_{22}Si_5$ | $Li_{4.4}Si$ | − | 94 | 1.23 |

Hereinafter, comparison results with Comparative Example 1, which serves as the baseline, will be discussed.

In the all-solid-state batteries of Comparative Examples 2 to 5, elemental Si was not used as a raw material for the anode active material. In this case, the coulombic efficiencies during initial charge and discharge of Comparative Examples 2 to 5 are from 84% to 94% each and higher than the coulombic efficiency during initial charge and discharge of Comparative Example 1.

However, the specific internal resistances of the all-solid-state batteries of Comparative Examples 2 to 5 are from 1.23 to 1.31 each. This results indicates that the internal resistances of the all-solid-state batteries of Comparative Examples 2 to 5 are each at least 20% higher than the internal resistance of the all-solid-state battery of Comparative Example 1. It is thought that this is because, since only the crystalline LiSi alloy was used as the anode active material in Comparative Examples 2 to 5, the resistance was high when the Li transferred inside the anode active material.

Meanwhile, in the all-solid-state batteries of Examples 1 to 7, both the LiSi alloy and the elemental Si were contained as the anode active material. According to Table 2, the anode active materials of Examples 1 to 7 have peaks at positions of 2θ=20.2°±0.5°, 23.3°±0.5°, 40.5°±0.5°, and 46.0°±0.5° in the XRD spectra obtained by XRD measurement using CuKα radiation. In this case, the coulombic efficiencies during initial charge and discharge of Examples 1 to 7 are from 78% to 94% each and higher than the coulombic From the above results, the following was proved: since the anode active material for all-solid-state batteries according to the disclosed embodiments contains the elemental Si and the crystalline LiSi alloy, when the anode active material is contained in an all-solid-state battery, both an increase in the coulombic efficiency during initial charge and discharge of the all-solid-state battery and suppression of an increase in the resistance of the all-solid-state battery, are achieved.

The invention claimed is:

1. An anode material mixture consisting of:
   (A) lithium-silicon alloy,
   (B) elemental silicon, and
   (C) at least one of a binder, a solid electrolyte, an electroconductive material, or a solvent,
   wherein the anode material mixture is configured for use in all-solid-state batteries;
   wherein the anode material has peaks at positions of 2θ=20.2°±0.5°, 23.3°±0.5°, 40.5°±0.5°, and 46.0°±0.5° in a XRD spectrum obtained by XRD measurement using CuKα radiation;
   wherein, when the anode material mixture has the electroconductive material, the electroconductive material is vapor grown carbon fiber; and
   wherein, when a total of a molar amount of the lithium-silicon alloy and that of the elemental silicon is considered to be 100 mol %, a molar ratio of the lithium-silicon alloy to the elemental silicon is from 1.0:99 to 65:35.

2. The anode material mixture according to claim 1, wherein an element ratio of the lithium based on the silicon in the anode material mixture, is from 0.20 to 4.0.

3. The anode material mixture according to claim 1, wherein the lithium-silicon alloy and elemental silicon are particulate.

4. The anode material mixture according to claim 1, wherein the elemental silicon is crystalline.

5. The anode material mixture according to claim 1, wherein the anode material further has peaks at positions of $2\theta=28.5°\pm0.5°$, $47.0°\pm0.5°$, and $56.0°\pm0.5°$ in the XRD spectrum.

6. The anode material mixture according to claim 1, wherein the anode material mixture has at least two of the binder, the solid electrolyte, the electroconductive material, or the solvent.

7. The anode material mixture according to claim 1, wherein the anode material mixture has at least three of the binder, the solid electrolyte, the electroconductive material, or the solvent.

8. The anode material mixture according to claim 1, wherein the anode material mixture has the binder, the solid electrolyte, the electroconductive material, and the solvent.

9. An all-solid-state secondary battery, comprising: an anode, a cathode, and a solid electrolyte layer disposed between the cathode and the anode, wherein the anode consists of the anode material mixture according to claim 1 disposed on a current collector.

10. The all-solid-state secondary battery according to claim 9, wherein the cathode comprises a cathode active material and a solid electrolyte.

11. The all-solid-state secondary battery according to claim 10, wherein the solid electrolyte of the cathode is a sulfide-based solid electrolyte.

12. The all-solid-state secondary battery according to claim 9, wherein the anode includes the solid electrolyte.

13. The all-solid-state secondary battery according to claim 12, wherein the solid electrolyte of the anode is a sulfide-based solid electrolyte.

14. The all-solid-state secondary battery according to claim 9, wherein the solid electrolyte layer comprises a sulfide-based solid electrolyte.

* * * * *